United States Patent
Dong et al.

(10) Patent No.: US 10,387,901 B1
(45) Date of Patent: *Aug. 20, 2019

(54) EFFICIENT LARGE-SCALE COMPENSATION CALCULATION SYSTEM

(71) Applicant: Versata Development Group, Inc., Austin, TX (US)

(72) Inventors: G. Randell Dong, Cedar Park, TX (US); Richard N. Hooper, Austin, TX (US)

(73) Assignee: VERSATA DEVELOPMENT GROUP, INC., Austin, TX (US)

( * ) Notice: Subject to any disclaimer, the term of this patent is extended or adjusted under 35 U.S.C. 154(b) by 72 days.

This patent is subject to a terminal disclaimer.

(21) Appl. No.: 15/272,830

(22) Filed: Sep. 22, 2016

Related U.S. Application Data

(63) Continuation of application No. 10/319,053, filed on Dec. 13, 2002, now Pat. No. 9,495,691.

(51) Int. Cl.
*G06Q 30/02* (2012.01)

(52) U.S. Cl.
CPC .................. *G06Q 30/0207* (2013.01)

(58) Field of Classification Search
CPC .............................. G06Q 30/00; G06Q 30/02
USPC ....................................................... 705/14.27
See application file for complete search history.

(56) References Cited

U.S. PATENT DOCUMENTS 5,774,870 A * 6/1998 Storey .................. G06Q 20/204
705/14.27

OTHER PUBLICATIONS

Notice of Allowance dated Jul. 1, 2016, mailed in U.S. Appl. No. 10/319,053, pp. 1-19.
Advisory Action dated Apr. 13, 2016, mailed in U.S. Appl. No. 10/319,053, pp. 1-11.
Request for Continued Examination (RCE) and RCE Submission as filed in U.S. Appl. No. 10/319,053 dated Apr. 6, 2016, pp. 1-21.
Response to Final Office Action dated Oct. 6, 2015, as filed in U.S. Appl. No. 10/319,053 on Mar. 7, 2016, pp. 1-18.
Final Office Action dated Oct. 6, 2015, mailed in U.S. Appl. No. 10/319,053, pp. 1-16.
Response to Non-Final Office Action dated Dec. 5, 2014, as filed in U.S. Appl. No. 10/319,053 on May 5, 2015, pp. 1-25.

(Continued)

*Primary Examiner* — Marilyn G Macasiano
(74) *Attorney, Agent, or Firm* — Kent B. Chambers; Terrile, Cannati & Chambers, LLP

(57) ABSTRACT

The compensation calculation system provides in one embodiment a promotion based system. A series of user interfaces allow a user to define an incentive program, such as a promotion program, for customers of an entity. In one embodiment, the definition of an incentive program includes the customers who will participate in the program, the products that are the subject of the program, various levels of attainments that must be met to obtain compensation, and the payout generation details. The system efficiently determines accumulations relevant to the attainments and payouts using a combination snowflake data schema and nested set model to facilitate high performance determination of accumulation values. "What-if" analyses can be undertaken in a reasonable amount of time to, for example, determine and/or compare different compensation payouts based on changing variables that affect compensation.

16 Claims, 12 Drawing Sheets

(56) References Cited

OTHER PUBLICATIONS

Non-Final Office Action dated Dec. 5, 2014, mailed in U.S. Appl. No. 10/319,053, pp. 1-44.
Request for Continued Examination (RCE) and RCE Submission as filed in U.S. Appl. No. 10/319,053 dated Sep. 10, 2014, pp. 1-20.
Final Office Action dated Mar. 10, 2014, mailed in U.S. Appl. No. 10/319,053, pp. 1-33.
Response to Non-Final Office Action dated May 23, 2013, as filed in U.S. Appl. No. 10/319,053 on Nov. 25, 2013, pp. 1-13.
Non-Final Office Action dated May 23, 2013, mailed in U.S. Appl. No. 10/319,053, pp. 1-29.
Request for Continued Examination (RCE) and RCE Submission as filed in U.S. Appl. No. 10/319,053 dated Aug. 9, 2011, pp. 1-20.
Advisory Action dated Aug. 3, 2011, mailed in U.S. Appl. No. 10/319,053, pp. 1-3.
Response to Final Office Action dated Feb. 10, 2011, as filed in U.S. Appl. No. 10/319,053 on Jul. 11, 2011, pp. 1-16.
Final Office Action dated Feb. 10, 2011, mailed in U.S. Appl. No. 10/319,053, pp. 1-14.
Response to Non-Final Office Action dated Jun. 22, 2010, as filed in U.S. Appl. No. 10/319,053 on Nov. 22, 2010, pp. 1-17.
Non-Final Office Action dated Jun. 22, 2010, mailed in U.S. Appl. No. 10/319,053, pp. 1-19.
Advisory Action dated May 18, 2010, mailed in U.S. Appl. No. 10/319,053, pp. 1-3.
Request for Continued Examination (RCE) and RCE Submission as filed in U.S. Appl. No. 10/319,053 dated May 12, 2010, pp. 1-3.
Response to Final Office Action dated Nov. 12, 2009, as filed in U.S. Appl. No. 10/319,053 on Apr. 12, 2010, pp. 1-17.
Advisory Action dated Mar. 10, 2010, mailed in U.S. Appl. No. 10/319,053, pp. 1-3.
Response to Final Office Action dated Nov. 12, 2009, as filed in U.S. Appl. No. 10/319,053 on Feb. 12, 2010, pp. 1-16.
Final Office Action dated Nov. 12, 2009, mailed in U.S. Appl. No. 10/319,053, pp. 1-15.
Response to Non-Final Office Action dated Jan. 26, 2009, as filed in U.S. Appl. No. 10/319,053 on Jul. 23, 2009, pp. 1-14.
Non-Final Office Action dated Jan. 26, 2009, mailed in U.S. Appl. No. 10/319,053, pp. 1-15.
Request for Continued Examination (RCE) and RCE Submission as filed in U.S. Appl. No. 10/319,053 dated Nov. 21, 2008, pp. 1-16.
Advisory Action dated Nov. 10, 2008, mailed in U.S. Appl. No. 10/319,053, pp. 1-3.
Response to Final Office Action dated May 21, 2008, as filed in U.S. Appl. No. 10/319,053 on Oct. 21, 2008, pp. 1-13.
Final Office Action dated May 21, 2008, mailed in U.S. Appl. No. 10/319,053, pp. 1-11.
Response to Non-Final Office Action dated Aug. 28, 2007, as filed in U.S. Appl. No. 10/319,053 on Feb. 28, 2008, pp. 1-14.
Non-Final Office Action dated Aug. 28, 2007, mailed in U.S. Appl. No. 10/319,053, pp. 1-17.

* cited by examiner

Incentive Program Summary — 600

Program No: XYZ100 — 602
Program Title: AA-Brand Rebates — 604
Start Date: 1/1/2002 — 606   End Date: 12/31/2002 — 608
Payment Period: ○ Monthly  ○ Quarterly  ● Semi-Annual  ○ Annual  ○ End of Program — 610
Report Date: 12/15/2002 — 612   % Floor Deduction: 4 — 616
Summary of Accumulations: — 614
2001- W, X, Y, Z T7 Retail and Contract
X, Y T7 Retail
W, X, Y, Z T7 Retail and Contract

[Select Organizations]
Included Organizations:
☐ AA Total

Excluded Organizations:
☐ 0000521351 AA TX
☐ 0000587642 AA OK

Summary of Promotions:
Base Volume Promotion

[Add] [Open] [Delete]

Promotion Details — 618

Name: Base Volume Rebate   Number: PR0100AA

Summary of Attainments:
Combined Sales at least even with last year
Combined Sales of at least $150,000

Summary of Payouts:
Base Volume Rebate Payout Schedule

[Add] [Open] [Delete]

Figure 5. Screen for defining an accumulation's product set.

FIG. 11

Payout Tiers — 1102

| Achieve $ | Pay % |
|---|---|
| 150,000 | 1 |
| 200,000 | 1.5 |
| 350,000 | 2 |
| 500,000 | 2.25 |
| 650,000 | 2.5 |
| 800,000 | 2.75 |
| 1,000,000 | 3 |
| 2,000,000 | 4 |

Delete Current Row

Achieves On: — 1104
- ○ Growth Over Same Period Last Year (%) — 1108
- ● Minimum Sales Volume Target of ($) — 1110

Accumulation: W, X, Y, Z T7 Retail and Contract ▼

Pays On: — 1106
- ● Percent of Total Sales Volume ($) — 1112
- ○ Constant Within Tier ($) — 1114

Accumulation: W, Y T7 Retail ▼

Name: Base Volume Rebate Payout Schedule

Define New Accumulation

OK   Cancel

1100

EFFICIENT LARGE-SCALE COMPENSATION CALCULATION SYSTEM

BACKGROUND OF THE INVENTION

Field of the Invention

The present invention relates in general to the field of information processing, and more specifically to a system and method for calculating compensation.

Description of the Related Art

Systems have been developed to address compensation calculations. For example, FIG. 1 depicts one example of a commission calculation system 100. In one embodiment, commission calculation system 100 provides a method and apparatus for determining the commission to be paid to a sales representative or sales team. Whenever a sale occurs, a transaction describing the sale is created. When commission calculation system 100 is tasked with determining compensation for one or more sales representatives, all transactions 102 are inputted into the commission engine 104. Based on a set of allocation rules 106 stored in the commission model 108 that specify the credit an individual is to receive from transactions 102, the allocate module 110 converts the transactions 102 into allocations 112 for individual Sales Representatives or Sales Teams. The quota rules 114 specify a target or goal that must be reached for a sales representative or sales team to earn a commission. The commission engine 104 generates quota details 118 from the allocations 112. Quota details 118 are generated by loading customer and product hierarchies into memory and importing transactions in batches. The quota details 118 contain the change in the current status of the sales representative's progress towards a promotion. Each transaction has an associated accumulation of, for example, product sales volume, that is divided into sub-accumulations for each sales representative who will receive credit for the transaction. The aggregate module processes the quota details 118 to determine a quota state 122 for each sales representative. Each sales representative's quota state 122 indicates the current performance of a Sales Representative with respect to a particular quota within a particular time frame. The payout a sales representative is to receive as a result of the aggregated sales transactions is determined by the compensate module 124 using the promotion model 126. The promotion specifies the reward or commission that is received upon attaining a desired level of performance. Once a sales representative's quota slate reaches a level necessary to receive a payout, such as a commission or reward, payouts 128 for each sales representative are generated. In this manner, a business may set up incentive plans and determine commissions.

The commission calculation system 100 represents a transaction-based system in that compensation is determined from a set of quota details 118 that indicate the contribution of each transaction to a sales representative's quota. The quota details represent one of the intermediate results generated by commission calculation system 100, which are used to ultimately determine the payout to a sales representative. When hundreds of thousands or millions of transactions are processed on a daily basis, these intermediate results can require a significant amount of physical memory and cause significant increases in payout processing time.

SUMMARY OF THE INVENTION

In one embodiment of the present invention, a compensation calculation system to determine payouts to customers who participate in one or more promotion programs includes an incentive program model having data that includes the customers, attainment details, and payout details. The system further includes a transaction, customer, and product database, a promotion calculation engine having accumulation, attainment, and payout modules. The accumulation module is operable to access the transaction, customer, and product database to determine an accumulation value for each customer for transactions associated with the promotion program. The attainment module is operable to access the attainment details and accumulation value for each customer and determine whether each customer has achieved attainment objectives. The payout module is operable to determine a payout, in accordance with the payout details, to each customer who has achieved the attainment objectives.

In another embodiment of the invention, a method of determining one or more promotions includes accessing a transaction, customer, and product database to retrieve accumulation value data for each customer, wherein the accumulation value is a metric used for determining customer attainments. The method further includes determining the respective accumulation value for each customer and accessing an incentive program model to obtain incentive program attainment details for each customer. The method also includes determining whether each customer respectively achieved attainment objectives based on the attainment details and respective accumulation values and generating a payout report for each customer who achieved the attainment objectives.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 6 depicts an incentive program summary user interface.

FIG. 8 depicts a user interface for defining an accumulation product set.

FIG. 11 depicts a user interface to define payouts.

DETAILED DESCRIPTION

The compensation calculation system provides in one embodiment a promotion based system. A series of user interfaces allow a user to define an incentive program, such as one or more promotion programs, for customers of an entity. In one embodiment, the definition of an incentive program includes the customers who will participate in the program, the products that are the subject of the program, various levels of attainments that must be met to obtain compensation, and the payout generation details. In one embodiment, attainments and payouts are determined using an efficient linear model of the form mA+b, where m is a multiplier, A is an accumulation value, and b is a static condition.

A promotion based system locates transactions that apply to a particular promotion. This approach can eliminate generation of intermediate results, such as quota details. Thus, a promotion based system can see substantial performance increases. Embodiments of the compensation calculation system utilize a combination of efficient data structures, such as nested set models and Star/Snowflake schemas, and associated efficient query operations to further enhance performance. The achievement of significant performance improvement over conventional technology allows for operations that conventional technologies could not realistically achieve. For example, per customer compensation calculations involving, for example, 10,000,000 transactions and a 100,000 member aggregate customer sets can be performed in a matter of hours and generally on the order of 100 times faster than prior art systems. Furthermore, "what if" analyses can be undertaken in a reasonable amount of time to, for example, determine and/or compare different compensation payouts based on changing variables that affect compensation. Additionally, when customers move from one promotion program to another, fill retroactivity can be calculated in a useful amount of time due to the performance improvement.

Figure 1:
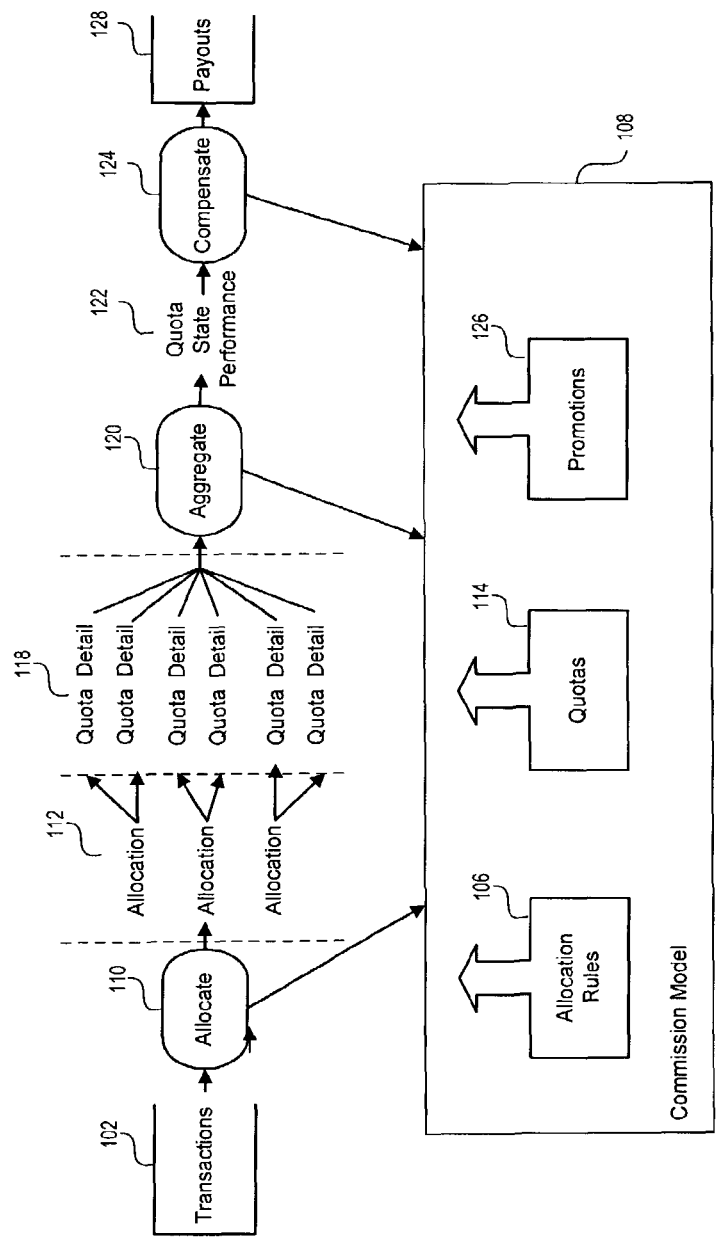
FIG. 1 depicts a prior art commission calculation system.
Figure 2:
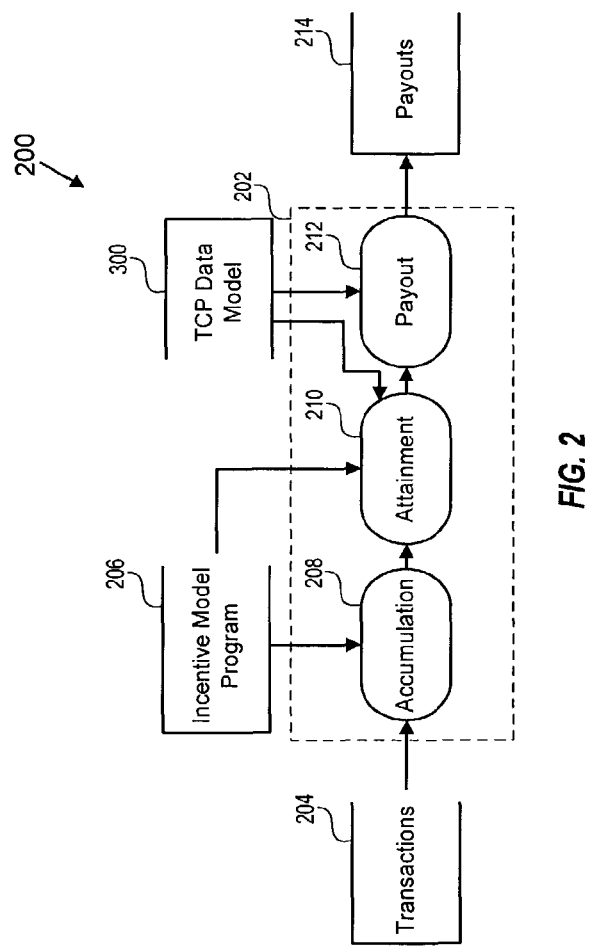
FIG. 2 depicts a promotion calculation system.

The promotion calculation system 200 depicted in FIG. 2 represents one embodiment of a compensation calculation system. The promotion calculation engine 202 receives transactions 204 and generates accumulations using accumulation module 208. The promotion calculation engine 202 also generates attainments using the attainment module 210, and payouts using the payout module 212. Calculation engine 202 operates using data from the incentive program model 206 and TCP data model 300.

Following is an exemplary explanation of primary terminology utilized in this description.

Incentive Program.

In one embodiment, incentive program 206 represents a set of terms and conditions designed to influence a customer's purchasing behavior. Incentive program 206 applies to a given set of customers over a specific time period. The incentive program 206 contains participating customer details, included product details, accumulation details, attainment details, and payout details. In one embodiment, these details along with other standard properties such as start and end dates and promotion IDs define the terms and conditions of incentive program model 206.

Transactions.

Each of transactions 204 contains, for example, information about a customer and a product purchased by the customer. Such customer and product information includes, for example, a customer ID, a product ID, a unit price of the product, the quantity of product sales, and a transaction date. Note that a customer could be a single entity, such as a single store, or a group of entities, such as all stores within a chain of retail stores.

Accumulations.

Accumulations are generally transaction measures that are used to determine whether attainment goals have been met. For example, an accumulation could be the number of products X, Y, and Z purchased or the total purchase price for products X and Y. If attainments have been met, the promotion calculation system 200 determines the appropriate payout 214 to a customer. Payout 214 is one embodiment of compensation that can be generated by promotion calculation system 200. As described in more detail below, the promotion calculation system 200 determines accumulations and attainments based on information contained in the incentive program model 206.

Accumulation 208 is the sum of a specific transaction measure over a given set of transactions. 'Dollar volume' determined by a product's unit price times the quantity purchased is a typical transaction measure. A specific set of customers, products, and a time span defines the transaction set. An example accumulation calculation is as follows: sum the dollar volume sales of all Global Hardware brand circular saws to Home Improvement Superstores between Jan. 1, 2002 and Jan. 1, 2003. Global Hardware brand circular saws represent the product set and Home Improvement Superstores represent the customer set. The two dates define the time span.

Attainment.

In one embodiment, an attainment is an objective to be met. In one embodiment, customers must satisfy promotion attainment requirements before the customers qualify for payouts. The promotion calculation system 200 determines whether or not each customer has satisfied the attainments by evaluating attainment conditions contained in incentive program model 206. In one embodiment, evaluating attainment conditions uses the following logic: if the test condition is greater than or equal to the reference condition then the attainment has been met. An example attainment is as follows: This year's sales of Global Hardware circular saws to Home Improvement Superstores must be at least even with last year's sale of Global Hardware circular saws to Home Improvement superstores. In this example last year's sales of Global Hardware circular saws to Home Improvement Superstores define the reference condition. This year's sales of Global Hardware circular saws to Home Improvement superstores define the test condition.

Promotion.

The incentive program model 206 may also contain one or more promotions. A promotion contains attainments and payouts that reward a customer for achieving specified objectives. For example: Global Hardware will give the Home Improvement Superstores a $10,000 rebate if they buy at least 5000 Global Hardware brand circular saws between Jan. 1, 2002 and Jan. 1, 2003. An incentive program may have multiple promotions. In one embodiment, the promotion calculation system 200 groups attainments and payouts that apply to a promotion into an independent set.

Payout.

A payout is the benefit an entity receives upon satisfying one or more attainments. A customer satisfying all of the promotion's attainments becomes eligible for the promotion's payouts 214. Each payout 214 rewards the customer for achieving a certain level of performance. Each payout 214 may have multiple payout tiers that reward the customer differently depending upon their level of achievement. In one embodiment, for each payout tier the promotion calculation system 200 evaluates three conditions based on the following logic: if the test condition is greater than or equal to the reference condition then base the payout 214 on the payment condition. Consider the following example payout 214 with two tiers: $100,000 in sales of Global Hardware circular saws to Home Improvement Superstores during the time period between Jan. 1, 2002 and Jan. 1, 2003 rewards Home Improvement Superstores with a 1% rebate. Global Hardware circular saw sales of $200,000 to Home Improvement Superstores during the time period between Jan. 1, 2002 and Jan. 1, 2003 rewards Home Improvement Superstores with a 2% rebate. In this case the reference condition for the first tier is $100,000 and the reference condition for the second tier is $200,000. The test condition for each tier is 100% of the dollar volume sales of Global Hardware circular saws to Home Improvement Superstores during the time period between Jan. 1, 2002 and Jan. 1, 2003. The payment condition for the first tier is 1% of the dollar volume sales of Global Hardware circular saws to Home Improvement Superstores during the time period between Jan. 1, 2002 and Jan. 1, 2003. The payment condition for the second tier is 2% of the dollar volume sales of Global Hardware circular saws to Home Improvement Superstores during the time period between Jan. 1, 2002 and Jan. 1, 2003.

In one embodiment, the promotion calculation system 200 evaluates attainments in light of one or more accumulations. Payouts are generally not computed unless attainments have been met. In one embodiment, attainment and payout conditions use the following general linear equation: $C=mA+b$, where C is the condition, m is a multiplier (such as a percentage), A is an accumulation, and b is a static offset (such as a starting condition). Consider the following example payout condition: "25% of this year's dollar volume sales of Global Hardware circular saws to Home Improvement Superstores minus a $1000 processing fee." In this example, the multiplier, $m,=0.25$, the accumulation, $A,=$"this year's dollar volume sales of Global Hardware circular saws to Home Improvement Superstores" and the static condition, $b,=-\$1,000$. Thus, the payout=0.25*A−1,000 dollars. "b" could also be, for example, a positive number to assist a customer in reaching an attainment.

Data Schema.

The promotion calculation system 200 gains efficiency over conventional technology by utilizing a unique combination of data schemas, which are collectively represented in the transaction, customer, product ("TCP") data model 300. The TCP data model 300 combines a 'snowflake' schema, which is an extension of a 'star' schema, with nested set models. A star schema is a particular way of modeling multidimensional data in a database. It is characterized by a central fact table which contains foreign keys from some number of dimension tables. The star schema is relatively common in multidimensional data modeling, and most database products (like Oracle and Microsoft SQL Server) provide special optimizations for querying them. *The Data Warehouse Lifecycle Toolkit*, by Ralph Kimball et al., John Wiley & Sons, Inc. New York 1998. ISBN 0-471-25547-5 as well as each database vendor's database administration manuals describe conventional examples of star and snowflake schemas.

Figure 3:
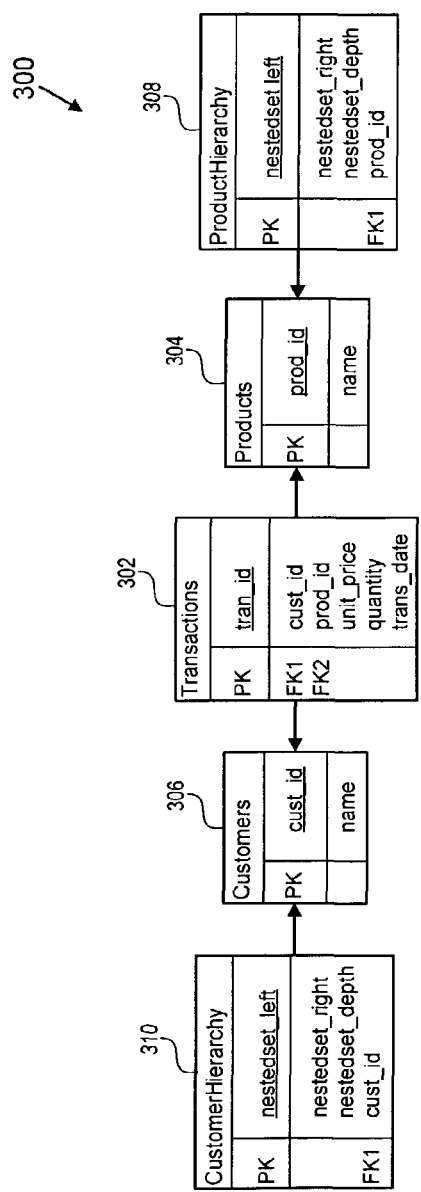
FIG. 3 depicts one embodiment of a data model for efficiently storing data utilized by the promotion calculation system of FIG. 2.

Referring to FIG. 3, the transaction table 302 serves as the central fact table in TCP data model 300. The two main dimensions of 302 are the product and the purchasing customer. Each transaction table 302 has a foreign key, FK, that points to a specific products dimension table 304 and a customer dimension table 306. TCP data model 300 implements a snowflake schema because the product hierarchy table 308 and the customer hierarchy table 310 are leaf dimension tables that link to the products dimension table 304 and the customer dimension table 306, respectively. The data in transaction table 302 is generally imported from a company's order entry system.

As described in more detail below, the promotion calculation system 200 allows users to include customers and products in a promotion incentive program. It is generally more efficient to select groups of customers and groups of products than to select individual customers and products for inclusion into the program. Thus, TCP data model 300 includes customer hierarchy and product hierarchy tables to store groups of customers and products, respectively. However, determining which products were sold to may require information on the level of the individual customer and product. Thus, TCP data model 300 also includes product dimension table 304 and customer dimension table 306, which contains the individual IDs of products and customers, respectively, which may become part of the program. The organization of TCP data model 300 provides significant performance increases over conventional compensation calculation technology.

The product hierarchy table 308 and the customer hierarchy table 310 use a nested set model to store hierarchies of products and customers, etc. Nested set models are generally described in *SQL for Smarties: Advanced SQL Programming* 2nd Edition, by Joe Celko, Morgan Kaufmann Publishers 2000. ISBN 1-55860-576-2. The nested set representation in combination with the snowflake schema has been determined to have excellent runtime query properties. The nested set representation allows promotion calculation system 200 to quickly obtain the complete subtree of any node in the product hierarchy table 308 and the customer hierarchy table 310. This facilitates high performance since, in one embodiment, calculating Accumulations for a node includes summing up all values for the entire subtree (known as a rollup in standard database terminology). Other data schemas can make obtaining accumulation values for each customer, which may be nested in a subtree of the customer hierarchy table, difficult or very inefficient.

Note that additional dimensions can be added to TCP data model 300, such as a sales channel. This could be a salesperson or a company's online store website. New dimensions could also be hierarchical and use the nested set representation. Adding a new dimension would result in Accumulations being defined for a subtree from each dimension, e.g. customer, product and sales channel. Also note that dimensions are not required to be hierarchical.

Flowchart, Object Model, and Example

Figure 4:
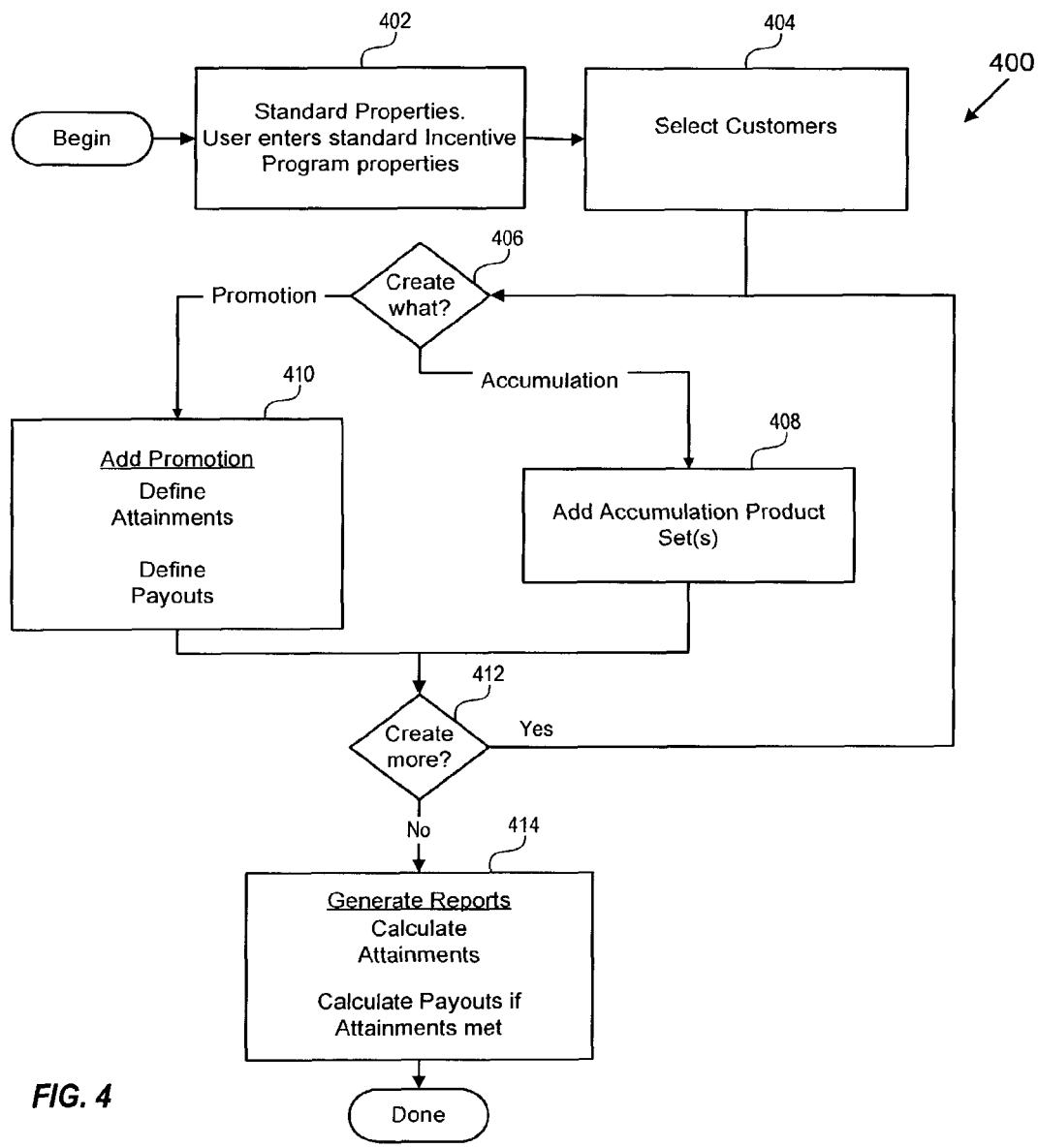
FIG. 4 depicts a compensation calculation process 400, which sets forth one embodiment of the operation of the promotion calculation system of FIG. 2.
Figure 5:
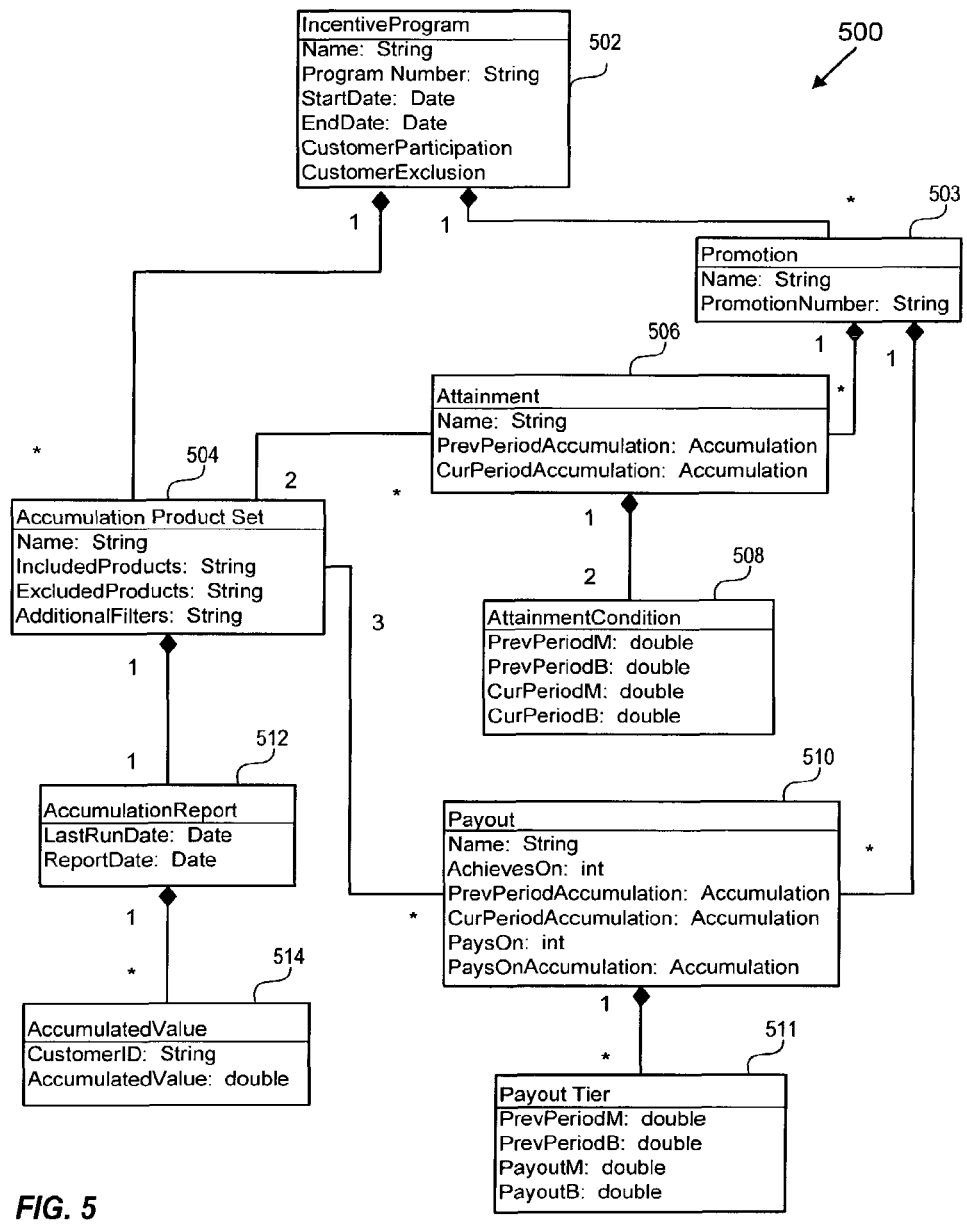
FIG. 5 depicts an incentive program data model 500 used by the compensation calculation process of FIG. 4.

FIG. 4 depicts compensation calculation process 400, which sets forth one embodiment of the operation of promotion calculation system 200. FIG. 5 depicts incentive program data model 500 used during compensation calculation process 400. The incentive program data model 500 is, for example, implemented as a relational database. FIGS. 6-11 depict example user interfaces generated by promotion calculation system 200 during an example promotion calculation.

The example promotion is entitled "Base Volume Rebate", as depicted in window 618 (FIG. 6). The "Base Volume Rebate" promotion is stored in Promotion data object 503. As indicated in FIG. 5, each promotion is associated with particular Attainment data objects and Payout data objects. The "Base Volume Rebate" promotion is defined as follows:

The Base Volume Rebate Promotion

The "Included Customers" in the incentive program model 206, i.e. AA Total customer members, except AA-TX and AA-OK customers, who are at 100% or above last year's combined W, X, Y, and Z top 7 (T7) model dollar volumes and do a minimum of $150,000 this year will earn a volume rebate on their X and Y retail channel dollar volume based on the following schedule set forth in Table 1:

TABLE 1

| Total T7 Purchases | Rebate Earned | Total T7 Purchases | Rebate Earned |
|---|---|---|---|
| $150,000 | 1.00% | $650,000 | 2.50% |
| $200,000 | 1.50% | $800,000 | 2.75% |
| $350,000 | 2.00% | $1,000,000 | 3.00% |
| $500,000 | 2.25% | $2,000,000 | 4.00% |

In the Base Volume Rebate promotion there are two attainments, three accumulations and one payout.

The two attainment criteria that customers included in the incentive program model 206 are required to achieve is set forth in Table 2:

TABLE 2

| Attainment No. | Base Volume Rebate promotion Attainment |
|---|---|
| 1 | 100% or above last year's combined W, X, Y, and Z T7 dollar volume. |
| 2 | Do a minimum of $150,000 combined W, X, Y, and Z T7 dollar volume. |

The three Accumulations for the Base Volume Rebate promotion are set forth in Table 3:

TABLE 3

| Accumulation No. | Accumulation Name | Base Volume Rebate Promotion Incentive Program Accumulation |
|---|---|---|
| 1 | 2001 - W, X, Y, Z T7 Retail and Contract | Included Customers' last year's combined W, X, Y, and Z T7 dollar volume. |
| 2 | W, X, Y, Z T7 Retail and Contract | This year's Included Customers' combined W, X, Y, and Z T7 dollar volume. |
| 3 | X, Y T7 Retail | This year's Included Customers' combined X and Y T7 retail channel dollar volume. |

The payout is a volume rebate to each of the Included Customers based on the schedule shown Table 1.

The following discussion details the creation of an incentive program using promotion calculation system 200.

The compensation calculation process 400 begins by creating the incentive program model 206. In operation 402, a user enters desired standard promotion incentive program properties such as: Program Name (Program Title), Program Number, and Start/End Dates. User interface (UI) 600 depicts an incentive program summary user interface and allows users to enter the standard promotion incentive program properties in fields 602, 604, 606, 608, 610, 612, and 614. In one embodiment, the Program Number is actually an alphanumeric string that uniquely identifies the promotion incentive program. The Program Title also identifies the promotion incentive program, but the Program Title may not be unique. For example, promotion incentive program may have the same name from year to year. The start date and end date define the Incentive Program's effective period. The payment period defines the frequency in which the customer will receive rebate payments. The percent floor deduction is a percentage deducted from the rebate payment to offset costs associated with administering the promotion incentive program. The Report Date field simply allows the user to define a specific date to generate reports on the customer's performance. The compensation calculation process 400 stores the promotion incentive program properties in IncentiveProgram data object 502. In one embodiment, the data object models of incentive program data model 500 map to database tables.

Figure 7:
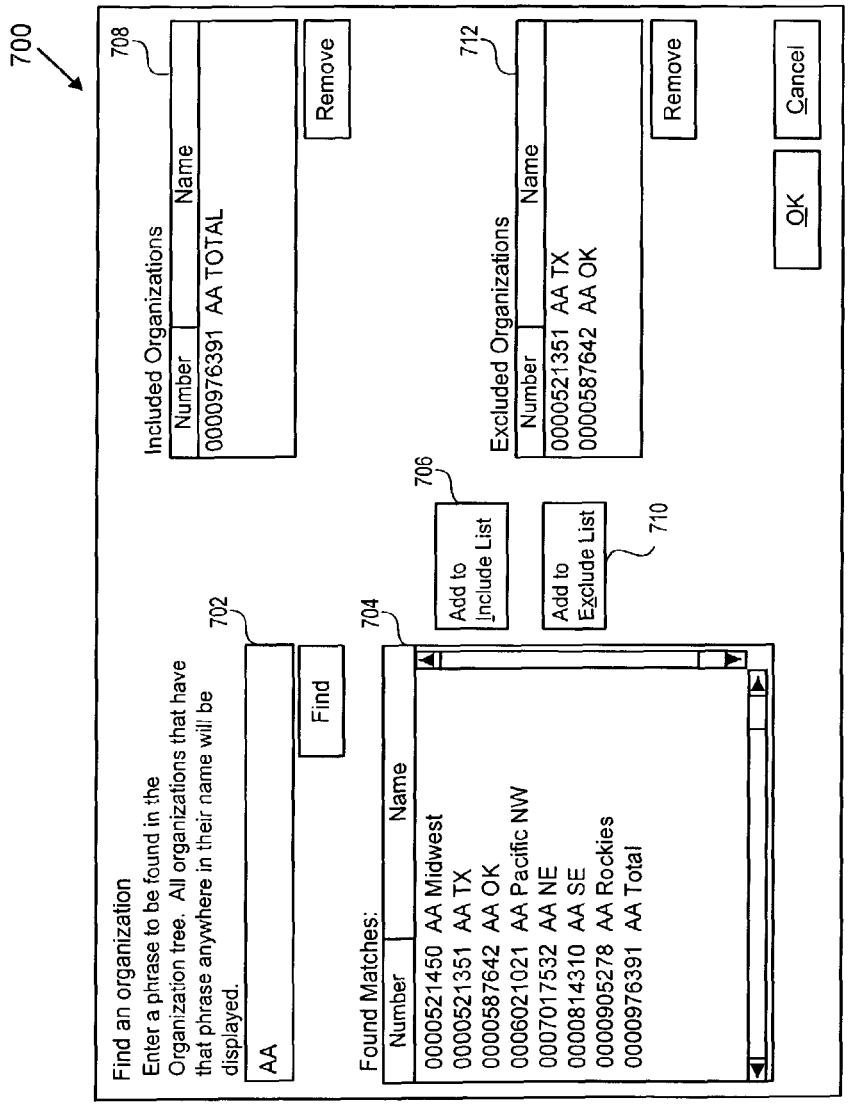
FIG. 7 depicts a customer selection user interface.

Referring to FIG. 7, once a user enters the standard promotion incentive program properties, a user selects customers to include in the promotion incentive program in operation 404. The promotion calculation system 200 and compensation calculation process 400 display UI 700. Entering characters in field 702 causes operation 404 to display customers and/or customer organizations having the entered characters in their name. To find the customers, operation 404 queries TCP data model 300 to obtain customer and customer organization information from customer dimension table 306 and customer hierarchy table 310 using Star queries (with standard optimizations for Snowflake data structures) and standard nested set queries, respectively. Window 704 displays customer/customer organization matches. Selecting button 706 adds a customer/customer organization to the promotion incentive program. Organization AA Total represents a superset of all customers and customer organizations within the group AA. In general, a customer set or superset can represent any number of customers, from one to hundreds of thousands or more. Selecting AA Total initially selects all customers and customer organizations belonging to the set AA Total to participate in the promotion incentive program No. XYZ100. Button 710 allows a user to exclude customers and customer organizations that are otherwise included. Window 712 indicates that customer organizations AA TX and AA OK are excluded from promotion incentive program XYZ100.

Operation 404 stores the customers and customer organizations selected for inclusion in the incentive program model 206 in the CustomerParticipation portion of IncentiveProgram data object 502. Customers excluded, as indicated in window 712, are stored in the CustomerExclusion portion of IncentiveProgram data object 502. Thus, all customers in superset AA Total are identified with CustomerParticipation, and customer organizations AA TX and AA OK are identified with CustomerExclusion.

Referring to FIG. 4, after customers have been selected and stored in TCP data model 300, operation 406 causes compensation calculation process 400 to proceed to operation 408 if the user desires to add an accumulation product set to incentive program model 206 or to operation 410 if the user desires to add a Promotion to incentive program model 206. Assuming compensation calculation process 400 proceeds to operation 408, a user is presented with UI 800.

Referring to FIG. 8, UI 800 defines an accumulation product set, which inherits the customer set and date range specified in the incentive program model 206. Field 802 allows the user to select which brands of products sold to customers in customer dimension table 306 to include in the accumulation product set. Products are retrieved from products dimension table 304 and product hierarchy table 308 using Star queries (with standard optimizations for Snowflake data structures) and standard nested set queries, respectively. Field 802 indicates selection of brands W, X, Y, and Z. The user can also include or exclude products from the selected brands by entering a search term in field 804 and including or excluding found products displayed in field 806. UI 800 indicates that the user selected button 808 to include product set 100320—ALL (i.e. all products with the brands selected in field 802), as displayed in field 810. Selecting button 812 allows a user to select a product or product set from field 806 and exclude the selected product from the accumulation product set. Field 814 indicates that product set 100330 ALL COMMERCIAL (i.e. all commercial products with the brands selected in field 802) has been excluded from the accumulation product set. Field 816 allows a user to further filter the accumulation product set. Field 816 indicates that only the top 7 (T7) of the included products are included in the accumulation product set. Field 818 allows a user to further filter the customer set selected in operation 404.

A user may not want a particular accumulation to apply to, for example, all customers and products participating in the promotion incentive program. Compensation calculation process 400 allows a user to modify the selected customer and product set by, for example, including additional filters to tailor the applicability of a specific accumulation. For example, field 818 indicates that only the retail and contract customers of the customers included in operation 404 will be included in the accumulation being defined in UI 800. Other customer filters are, for example, preferred vendors and specific governmental entities. Furthermore, the user further limits the products included in this accumulation to the top 7 (T7) products within the selected brands, W, X, Y, and Z.

Referring to FIG. 5, the accumulation product set defined in UI 800 is stored as indicated in Accumulation data object 504. In the ongoing example, IncludedProducts are associated with all products of brands W, X, Y, and Z. ExcludedProducts are associated with All Commercial products of the IncludedProducts. AdditionalFilters are associated with only the T7 products of W, X, Y, and Z and only the Retail and Contract customers in the customers selected in operation 400. The incentive program model 206 can include additional accumulation product sets by repeating operation 400. Referring to FIG. 6, accumulation X, Y T7 Retail represents accumulation no. 3 in Table 3.

Figure 9:
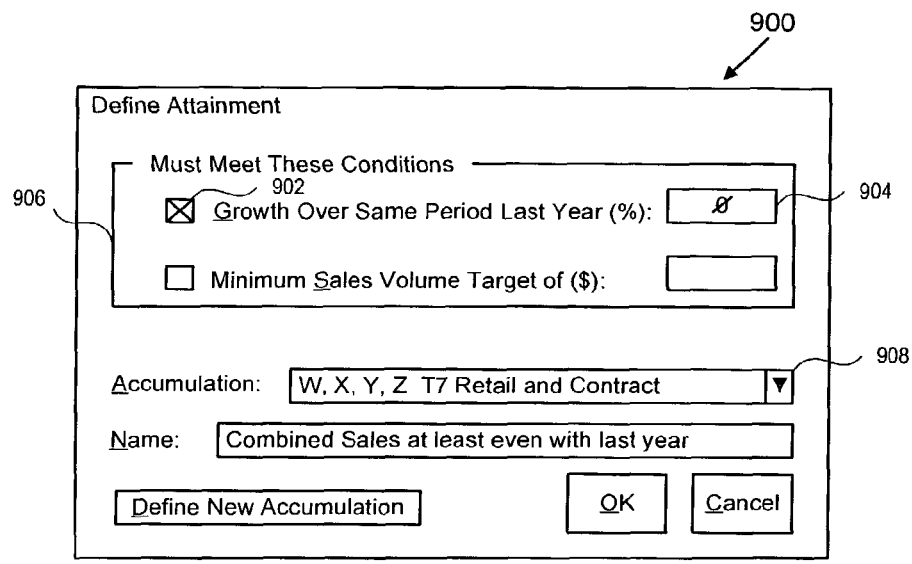
FIG. 9 depicts a user interface to define attainments.

The definition of the incentive program model 206 is completed by adding one or more Promotions. A Promotion is defined by defining Attainment and Payout criterion. Referring to FIG. 9, UI 900 is displayed to a user to define attainment 906, which is attainment no. 1 in Table 2. The first Base Volume Rebate promotion incentive program attainment set forth in Table 2 is depicted in FIG. 9. Recalling that the first of the two attainment criterion is the requirement that customers included in the incentive program model 206 be at "100% or above last year's combined W, X, Y, and Z T7 dollar volume", the user selects the condition "Growth Over Same Period Last Year (%)" in field 902." Zero percent growth is entered in field 904. Attainment 906 applies to the Accumulation selected in field 908 and is named "Combined Sales at least even with last year", which is displayed in window 620 (FIG. 6). Because the attainment "Combined Sales at least even with last year" references "Last Year", compensation calculation process 400 automatically generates accumulation no. 1 in Table 3. The "Combined Sales at least even with last year" attainment 906 is stored in Attainment data object 506 along with the previous period accumulation, accumulation no. 1 and the current period accumulation, accumulation no. 2, both from Table 3.

A separate AttainmentCondition data object 508 stores the multipliers, m, and the static offsets, b, for each attainment stored in Attainment data object 506. Last year's (PrevPeriod) and this year's (CurPeriod) multipliers are both 1 since 0% growth is indicated in field 904. There is no static condition to be met, so "b" is 0 for this year and last year. For the Attainment 906, the AttainmentCondition data object 508 can be represented by Table 4:

TABLE 4

| | |
|---|---|
| PrevPeriodM | 1 |
| PrevPeriodB | 0 |
| CurPeriodM | 1 |
| CurPeriodB | 0 |

Figure 10:
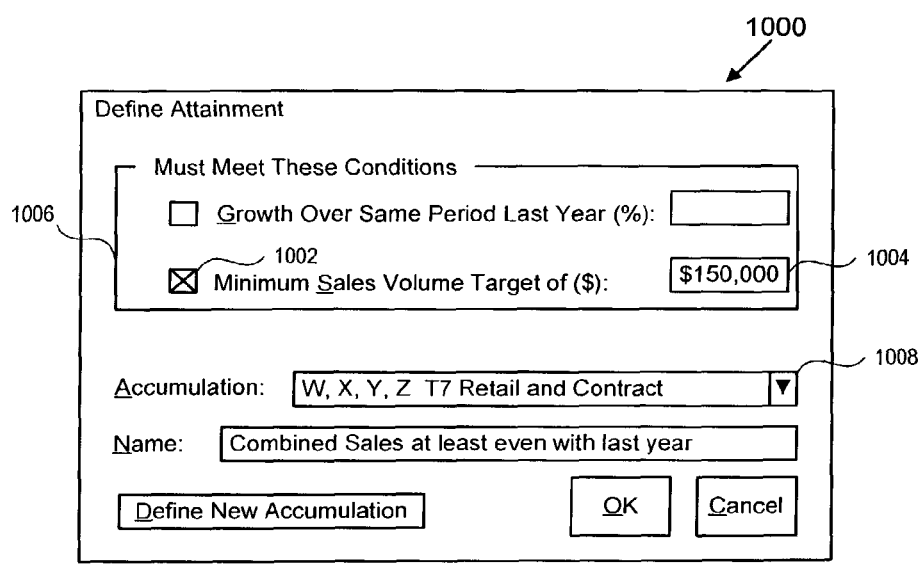
FIG. 10 depicts a user interface to define additional attainments.

Referring to FIG. 10, UI 1000 is identical to UI 900. The user defines the second Attainment for the Base Volume Rebate promotion, indicated in Table 2, by selecting field 1002 and entering the minimum sales volume target of $150,000/customer and associating the attainment 1006 with the W, X, Y, Z T7 Retail and Contract accumulation in fields 1004 and 1008, respectively. The "Combined Sales at least even with last year" attainment 1006 is stored in another Attainment data object 506 along with the accumulation no. 2 from Table 3.

Another AttainmentCondition data object 508 stores the multipliers, m, and the static offsets, b, for attainment 1006. Last year's (PrevPeriod) multiplier, m, and static condition, b, are 0 and 150,000 for attainment 1006. This year's multiplier, m, is 1 and the static condition, b, is 0. For the Attainment 1006, the AttainmentCondition data object 508 can be represented by Table 5:

TABLE 5

| | |
|---|---|
| PrevPeriodM | 0 |
| PrevPeriodB | 150,000 |
| CurPeriodM | 1 |
| CurPeriodB | 0 |

The UI 1100 is used to define a payout 214 that will occur if a customer achieves associated attainments. The information entered in UI 1100 is used by payout process 212 to determine the proper payout 214. The "Achieves On" window 1104 is generated from UI 1000 and specifies a particular accumulation and the criteria to achieve before a payout 214 is due. In this example, a payout is due when the minimum sales volume target of the Achieve $ column of payment tier table 1102 is achieved. In "Pays On" window 1106, the user also sets the criteria upon which the actual payout is based. UI 1100 indicates that payout criteria to apply to specific accumulation based on the level of achievement specified in the Achieve $ column. In this example, UI 1100 indicates that if a customer has achieved the minimum sales targets set forth in window 1104, a payout will be made based on the percent of sales of the accumulation W, Y T7 Retail. The particular percentage is specified in the Pay column of the payout tiers 1102 and determined by the sales volume of accumulation W, X, Y, Z T7 Retail and Contract. The payout information from UI 1100 is stored in Payout data object 510.

The payout tiers are stored in PayoutTier data object 511. Selection of field 1108 indicates that the Achieve $ column of payment tier table 1102 will represent a multiplier, m, associated with PrevPeriodM entry in Payout Tier data object 511. Selection of field 1110 indicates that the Achieve $ column of payment tier table 1102 will represent a static condition, b, associated with PrevPeriodB entry in Payout Tier data object 511. Selection of field 1112 indicates that the Pay % column of payment tier table 1102 will represent a multiplier, m, associated with PayoutM entry in Payout Tier data object 511. Selection of field 1114 indicates that the Pay % column of payment tier table 1102 will represent a static condition, b, associated with PayoutB entry in Payout Tier data object 511. Table 6 represents the entries of Payout Tier data object 511 for the payout defined in UI 1100:

TABLE 6

| PrevPeriodM | PrevPeriodB | ,PayoutM | PayoutB |
|---|---|---|---|
| — | 150000 | 1 | — |
| — | 200000 | 1.5 | — |
| — | 350000 | 2 | — |
| — | 500000 | 2.25 | — |
| — | 650000 | 2.5 | — |
| — | 800000 | 2.75 | — |
| — | 1000000 | 3 | — |
| — | 2000000 | 4 | — |

In operation 410, if all promotion and accumulation criterion have been entered, the incentive program model 206 is now fully defined, and the compensation calculation process 400 proceeds to report generation process 412.

The report generation process 412 is performed for each accumulation specified in window 616, the report generation process 412 populates the LastRunDate entry of AccumulationReport data object 512 with date of the last accumulation report and populates the ReportDate entry with the date for which the accumulation report is ran. For example, a report could be run on November $15^{th}$ for accumulations as of October $31^{st}$. The report generation process 412 next populates AccumulatedValue data object 514 by determining the accumulated value, A, of each accumulation specified in window 616 for each customer included in the accumulation. Table 7 represents one embodiment of AccumulatedValue data object 514 in which customers C1 and C3 are the two customers participating in the Bonus Volume Promotion. Note that in a typical promotion incentive program, the number of customers associated with each accumulation is in the thousands. The number of promotion incentive programs are typically in the hundreds.

TABLE 7

| Accumulation | Customer | A |
|---|---|---|
| 2001 - W, X, Y, Z T7 Retail and Contract | C1 | 256000 |
| 2001 - W, X, Y, Z T7 Retail and Contract | C3 | 148000 |
| W, X, Y, Z T7 Retail and Contract | C1 | 265000 |
| W, X, Y, Z T7 Retail and Contract | C3 | 149000 |
| X, Y T7 Retail | C1 | 120,000 |
| X, Y T7 Retail | C3 | 100,000 |

Because of the architecture of TCP data model 300 and available Star queries, the report generation process 412 determines the accumulation values A in a single query. In one embodiment, a single Star query run against TCP data model 300 is able to identify all transactions for all customers and products in each accumulation of the promotion incentive program within a specified date range. A structured query language (SQL) command can easily group transactions by customer and retrieve or determine a metric associated with an accumulation. An example metric is sales volume target dollars, which is equal to a product's unit price times it's quantity. The single Star query and SQL command are sufficient to completely populate Table 7.

In preparation for performing a Star query to obtain all accumulations for saving in AccumulateValue data object 514, report generation process 412 conducts queries 1-5 below. Queries 1-5 allow query 6 to be written in a more intelligible manner. Query 6 below is the actual Star query that calculates all accumulations and inserts them in AccumulationValue data object 514.

1. Insert 'Brands' join data:
INSERT INTO product_join (prod_id)
SELECT DISTINCT rollups.prod_id
FROM ProductHierarchy brands, ProductHierarchy rollups
WHERE brands.prod_id IN ('W', 'X', 'Y', 'Z')
    AND brands.nestedset_left⇐rollups.nestedset_left
    AND rollups.nestedset_left<brands.nestedset_right
2. Remove 'Excluded Products' from join data:
DELETE FROM product_join
WHERE prod_id IN (
    SELECT exclusions.prod_id
    FROM ProductHierarchy excluded, ProductHierarchy exclusions
    WHERE excluded.prod_id IN ('100330 All Commercial')
    AND excluded.nestedset_left⇐exclusions.nestedset_left
    AND
       exclusions.nestedset_left<excluded.nestedset_right)
3. Insert 'Included Organizations' join data:
INSERT INTO customer_join (cust_id)
SELECT DISTINCT rollups.cust_id
FROM CustomerHierarchy included, CustomerHierarchy rollups
WHERE included.cust_id IN ('AA TOTAL')
    AND included.nestedset_left⇐rollups.nestedset_left
    AND rollups.nestedset_left<included.nestedset_right
4. Remove 'Excluded Organizations' from join data:
DELETE FROM customer_join
WHERE cust_id IN (
    SELECT exclusions.cust_id
    FROM CustomerHierarchy excluded, CustomerHierarchy exclusions
    WHERE excluded.cust_id IN ('AA TX', 'AA OK')
    AND excluded.nestedset_left⇐exclusions.nestedset_left
    AND
       exclusions.nestedset_left<excluded.nestedset_right)
5. Update customer join data with grouping:
UPDATE customer_join
SET group_cust=(
SELECT grp.cust_id
FROM CustomerHierarchy grp, CustomerHierarchy child
WHERE child.cust_id=cust_id
    AND grp.nestedset_left⇐child.nestedset_left
    AND child.nestedset_left<grp.nestedset_right
    AND grp.nestedset_depth=1+(
    SELECT nestedset_depth
    FROM CustomerHierarchy
    WHERE cust_id='AA TOTAL'))
6. Perform Star query:
INSERT INTO AccumulatedValue (CustomerID, AccumulatedValue)
SELECT cj.group_cust, SUM(t.unit_price*t.quantity)
FROM CustomerHierarchy g, Transactions t, product_join pj, customer_join cj
WHERE t.trans_date>='1/1/2002'
    AND t.trans_date⇐'12/31/2002'
    AND t.cust_id=cj.cust_id
    AND t.prod_id=pj.prod_id
GROUP BY cj.group_cust Before report generation process 412 determines a payout for a customer, the Base Volume Promotion requires the customer to meet attainments 906 and 1006. Attainment 906 is achieved if (mA+b) for last year is greater than or equal to (mA+b) for this year, where m and b are stored in the AttainmentCondition data object 508 populated by data in UI 900 and A is stored in AccumulatedValue data object 514. Attainment 1006 is achieved if mA+b is greater than or equal to 150,000, where m and b are stored in the AttainmentCondition data object 508 populated by data in UI 1000. If a customer achieves attainments 906 and 1006, report generation process 412 determines a payout in accordance with the information entered in UI 1100 and stored in Payout data object 510 and Payout Tier data object 511.

Table 8 presents the results of report generation process 412 based on information in Table 7.

Figure 13:
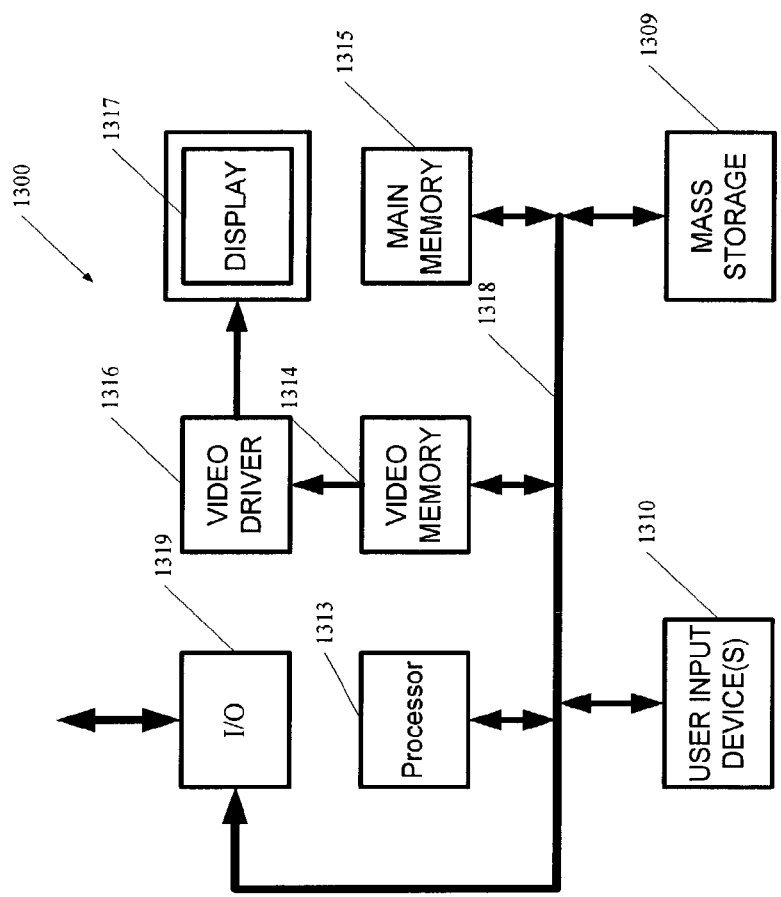
FIG. 13 depicts a computer system with which promotion calculation system 200 can be implemented.

Embodiments of the promotion calculation system 200 can be implemented on a computer system such as a general-purpose computer 1300 illustrated in FIG. 13. Input user device(s) 1310, such as a keyboard and/or mouse, are coupled to a bi-directional system bus 1318. The input user device(s) 1310 are for introducing user input to the computer system and communicating that user input to processor 1313. The computer system of FIG. 13 also includes a video memory 1314, main memory 1315 and mass storage 1309, all coupled to bi-directional system bus 1318 along with

TABLE 8

| Customer | mA + b last year | mA + b this year | Attainment 1 | mA + b | Attainment 2 | Payout |
|---|---|---|---|---|---|---|
| C1 | 1 * 256,000 + 0 = 256,000 | 1 * 265,000 + 0 = 265,000 | Achieved (265,000 >= 256,000) | 1 * 265,000 + 0 >= 150,000 | Achieved. | 0.015 * 120,000 = $1,800 less 4% admin expense (from window 614) |
| C2 | 1 * 148,000 + 0 = 148,000 | 1 * 149,000 + 0 = 149,000 | Achieved (149,000 >= 148,000) | 1 * 149,000 + 0 < 150,000 | Missed | 0 |

Because of the speed and efficiency it is now practical to perform "what-if" analyses, such as adjusting values in payment tier table 1102. On-going progress towards payouts can also be determined. When a customer moves from one organization to another, promotions for the customer can be recalculated in a timely manner to provide full retroactivity to promotion calculation system 200. The compensation calculation process 400 can be repeated for any number of additional promotion incentive programs.

Figure 12:
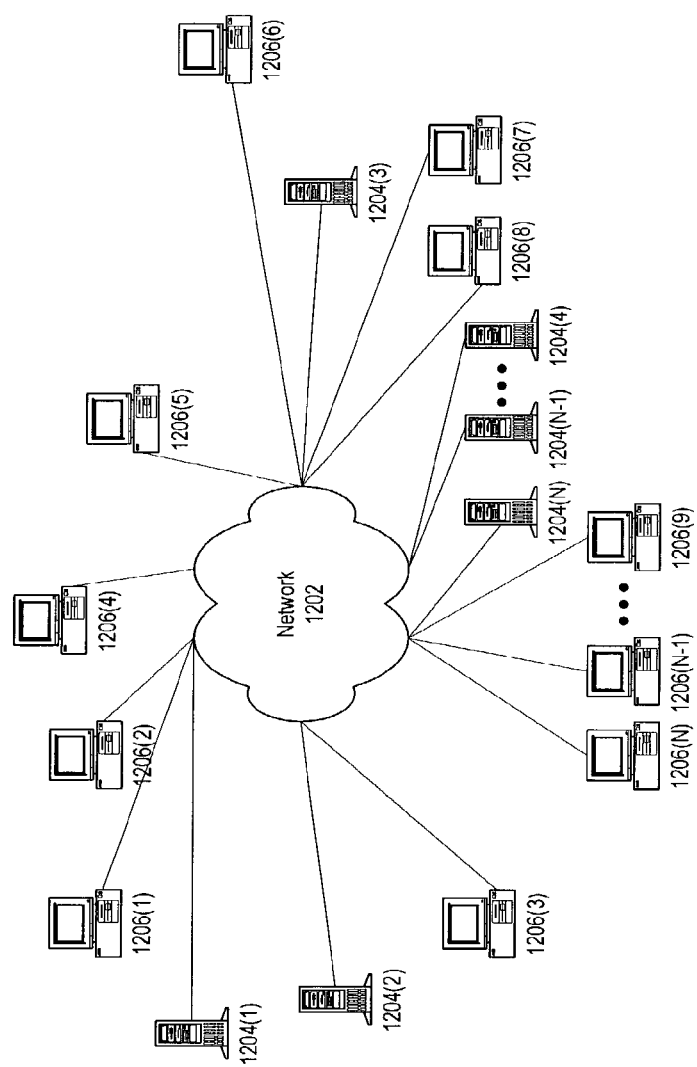
FIG. 12 depicts a block diagram illustrating a network environment in which a promotion calculation system of FIG. 2 can be practiced.

FIG. 12 is a block diagram illustrating a network environment in which a promotion calculation system 200 can be practiced. Network 1202 (e.g. a private wide area network (WAN) or the Internet) includes a number of networked server computer systems 1204(1)-(N) that are accessible by client computer systems 1206(1)-(N), where N is the number of server computer systems connected to the network. Communication between client computer systems 1206(1)-(N) and server computer systems 1204(1)-(N) typically occurs over a network, such as a public switched telephone network over asynchronous digital subscriber line (ADSL) telephone lines or high-bandwidth trunks, for example communications channels providing T1 or OC3 service. Client computer systems 1206(1)-(N) typically access server computer systems 1204(1)-(N) through a service provider, e.g., an Internet service provider such as America On-Line™, Prodigy™, CompuServe™, and the like by executing application specific software, commonly referred to as a browser, on one of client computer systems 1206(1)-(N).

Client computer systems 1206(1)-(N) and/or server computer systems 1204(1)-(N) may be, for example, computer systems of any appropriate design, including a mainframe, a mini-computer, a personal computer system, or a wireless, mobile computing device. These computer systems are typically information handling systems, which are designed to provide computing power to one or more users, either locally or remotely. Such a computer system may also include one or a plurality of input/output ("I/O") devices coupled to the system processor to perform specialized functions. Mass storage devices such as hard disks, CD-ROM drives and magneto-optical drives may also be provided, either as an integrated or peripheral device. One such example computer system is shown in detail in FIG. 13.

input user device(s) 1310 and processor 1313. The mass storage 1309 may include both fixed and removable media, such as other available mass storage technology. Bus 1318 may contain, for example, 32 address lines for addressing video memory 1314 or main memory 1315. The system bus 1318 also includes, for example, an n-bit DATA bus for transferring DATA between and among the components, such as CPU 1309, main memory 1315, video memory 1314 and mass storage 1309, where "n" is, for example, 32 or 64. Alternatively, multiplex DATA/address lines may be used instead of separate DATA and address lines.

I/O device(s) 1319 may provide connections to peripheral devices, such as a printer, and may also provide a direct connection to a remote server computer systems via a telephone link or to the Internet via an internet service provider (ISP). I/O device(s) 1319 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 1309 until loaded into main memory 1315 for execution. Computer programs may also be in the form of electronic signals modulated in accordance with the computer program and data communication technology when transferred via a network.

The processor 1313, in one embodiment, is a 32-bit microprocessor manufactured by Motorola, such as the 680X0 processor or microprocessor manufactured by Intel, such as the Pentium processor. However, any other suitable single or multiple microprocessors or microcomputers may be utilized. For large scale incentive program processing, 4-16 individual 32-bit of 64-bit microprocessors manufactured by Motorola, Intel, or IBM are used as processor 1313. Main memory 1315 is comprised of dynamic random access memory (DRAM). Video memory 1314 is a dual-ported video random access memory. One port of the video memory 1314 is coupled to video amplifier 1316. The video amplifier 1316 is used to drive the display 1317. Video amplifier 1316 is well known in the art and may be implemented by any suitable means. This circuitry converts pixel DATA stored in video memory 1314 to a raster signal suitable for use by display 1317. Display 1317 is a type of monitor suitable for displaying graphic images.

The computer system described above is for purposes of example only. The promotion calculation system 200 may be implemented in any type of computer system or programming or processing environment. It is contemplated that the promotion calculation system 200 might be run on a stand-alone computer system, such as the one described above. The promotion calculation system 200 might also be run from a server computer systems system that can be accessed by a plurality of client computer systems interconnected over an intranet network. Finally, the promotion calculation system 200 may be run from a server computer systems that is accessible to clients over the Internet.

Many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it should be understood that various changes, substitutions and alterations can be made hereto without departing from the spirit and scope of the invention as defined by the appended claims. For example, data entry can be achieved via methods other through UI's, such as text entry. Promotion incentive program can be renamed and modified to create new promotion incentive program without requiring data reentry. The promotion calculation system 200 is flexible to accommodate virtually innumerable variations of accumulation, attainment, and payout metrics and formulas.

What is claimed is:

1. A compensation calculation system to determine payouts to customers who participate in one or more promotion programs, the system comprising:
   a processor;
   a memory coupled to the one or more processors, wherein the memory includes stored data and the stored data includes an arrangement of tables in a multi-dimensional database having a fact table with entries that point to multi-dimensional tables that store data representing at least multiple customers of an entity, customer groups represented in a first model, multiple products, and product groups represented in a second model, the memory also includes stored data comprising multiple attainment details, multiple payout details, multiple transactions per customer associated with multiple products purchased per customer, and details for multiple promotion programs associated with the multiple transactions;
   wherein the memory also includes code stored in the memory and executable by the processor to configure a computer system into a compensation calculation system machine to:
      provide a user interface to allow (i) selection of a customer group within the customer groups, (ii) selection of customers within the selected customer group included in the database that are allowed to participate in a promotion program and (iii) selection of at least one of: (1) a product group within the product groups and products within the selected product group for inclusion in each of the promotion programs and (2) selection of one or more products for inclusion in each of the promotion programs;
      receive the selection of the customer group, a selection of the customers within the customer group, and selection of at least one of: (i) the product group and (ii) the one or more products;
      provide one or more user interfaces to be displayed to the selected customers within the customer group, wherein each user interface includes one or more components of the promotion programs for the customer to whom the user interface is displayed, wherein the components include (i) at least one of the payout details in the stored data that includes specifying performance levels associated with different payouts and (ii) at least one of the attainment details in the stored data;
      for each selected customer, generate a query against the database to identify all transactions for the purchase of one or more of the products by the selected customer in each accumulation of a promotion incentive program;
      store a result of the query in at least one accumulation value for each of the selected customers;
      access the attainment details and each accumulation value for each selected customer to determine whether the customer has achieved one or more attainment objectives; and
      determine a payout, in accordance with the payout details, to each selected customer who has achieved the one or more attainment objectives.

2. The compensation calculation system of claim 1 wherein the memory also includes code stored in the memory and executable by the processor to perform a "what if" analysis, wherein the code to perform the "what if" analysis comprises code executable by the processor to:
   modify data for at least one of the transactions, the promotion programs, or attainment details;
   determine at least one accumulation value for each of the selected customers associated with the multiple transactions that involved a sale of one or more of the products included in the selection of products and the modified data in accordance with the details of the promotion programs associated with the multiple transactions, wherein the accumulation value is a metric used for determining customer achievement of attainment objectives using the modified data;
   determine whether each customer respectively achieved one or more attainment objectives based on the attainment details and respective accumulation values using the modified data; and
   generate a payout report for each customer who achieved the attainment objectives using the modified data.

3. The compensation calculation system of claim 1 wherein the memory also includes code stored in the memory and executable by the processor to:
   perform a single database query to retrieve, for all the selected customers, the multiple transactions per customer associated with multiple products purchased per customer of the selected products and customers, retrieve the details for multiple promotion programs associated with the multiple transactions, and retrieve the attainment details for each customer.

4. The compensation calculation system of claim 1 wherein the memory also includes code stored in the memory and executable by the processor to:

determine the accumulation values for all the selected customers using a single query to the memory.

5. The compensation calculation system as in claim 1 wherein the fact table and multiple dimension tables are arranged in a snowflake data schema.

6. The compensation calculation system as in claim 5 wherein transaction data is stored in the fact table in the snowflake data schema, customer and product ID data is stored in respective dimension tables and customer and product hierarchies are stored in respective leaf dimension tables and in nested set model schemes.

7. The compensation calculation system as in claim 1 wherein a single query to the database stored in the memory retrieves all information for determining the accumulation values for all the selected customers.

8. The compensation calculation system as in claim 1 wherein the attainment objectives and payouts are determined using a linear equation of the form mA+b, where m is a multiplier, A is an accumulation value for each customer, and b is a static condition.

9. The compensation calculation system as in claim 1 further comprising N additional promotion programs, wherein N is a positive integer and the promotion calculation engine is operable to determine accumulation values, attainment objectives, and payouts for each customer participating in the respective promotion programs.

10. A method of determining payouts to customers of an entity who participate in one or more promotion programs, the method comprising:
providing a user interface to allow: (i) selection of a customer group within customer groups, (ii) selection of customers of an entity within the selected customer group included in a database that are allowed to participate in a promotion program, and (iii) selection of at least one of: (1) a product group within product groups and products within the selected product group for inclusion in each of the promotion programs and (2) selection of one or more products for inclusion in each of the promotion programs, wherein the database is a multi-dimensional database that includes an arrangement of tables having a fact table with entries that point to multiple dimension tables that store data representing the customers, customer groups represented in a first model, multiple products, and the product groups represented in a second model, the memory also includes stored data comprising multiple attainment details, multiple payout details, multiple transactions per customer associated with multiple products purchased per customer, and details for multiple promotion programs associated with the multiple transactions;
receiving the selection of customers and selection of products;
causing one or more user interfaces to be displayed to the customers of the entity that are selected to participate in the promotion program, wherein each user interface includes one or more components of one of the promotion programs for the customer to whom the user interface is displayed, wherein the components include (i) at least one of the payout details in the stored data that includes specifying performance levels associated with different payouts and (ii) at least one of the attainment details in the stored data;
generating a query against the database to identify all transactions for the purchase of one or more of the products by all selected customers in each accumulation of a promotion incentive program;
storing a result of the query in at least one accumulation value for each of the selected customers, wherein the accumulation value is a metric used for determining customer achievement of attainment objectives;
accessing the memory to retrieve attainment details for each selected customer;
determining whether each of the selected customers respectively achieved one or more attainment objectives based on the attainment details and respective accumulation values; and
generating a payout report for each of the selected customers who achieved the attainment objectives.

11. The method of claim 10 further comprising performing a "what if" analysis, wherein performing the "what if" analysis comprises:
modifying data for at least one of the transactions, the promotion programs, or attainment details; and
determining at least one accumulation value for each of the selected customers associated with the multiple transactions that involve (i) a sale of one or more of the products included in the selection of products and (ii) a customer selected to participate in the promotion program and the modified data in accordance with the details of the promotion programs associated with the multiple transactions, wherein the accumulation value is a metric used for determining customer achievement of attainment objectives using the modified data;
determining whether each selected customer respectively achieved one or more attainment objectives based on the attainment details and respective accumulation values using the modified data; and
generating a payout report for each selected customer who achieved the attainment objectives using the modified data.

12. The method of claim 10 further comprising organizing the transactions, customer data, and product data using a combined snowflake data schema with nested set models.

13. The method of claim 10 further comprising:
performing a single database query to retrieve the multiple transactions, for all selected customers, per selected customer associated with multiple, selected products purchased per selected customer, retrieve the details for multiple promotion programs associated with the multiple transactions, and retrieve the attainment details for each selected customer.

14. The method of claim 10 further comprising:
determining the accumulation values, for all selected customers, using a single query to the memory.

15. The method of claim 10 wherein the fact table and multiple dimension tables are arranged in a snowflake data schema.

16. The method of claim 15 wherein transaction data is stored in the fact table in the snowflake data schema, customer and product ID data is stored in respective dimension tables and customer and product hierarchies are stored in respective leaf dimension tables and in nested set model schemes.

* * * * *